April 15, 1924.
F. EDHOLM
1,490,164
FUEL INJECTING DEVICE FOR INTERNAL COMBUSTION ENGINES
Filed June 27, 1921
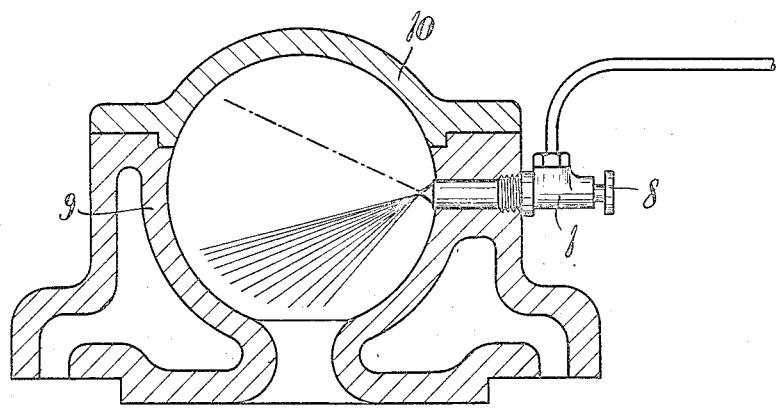
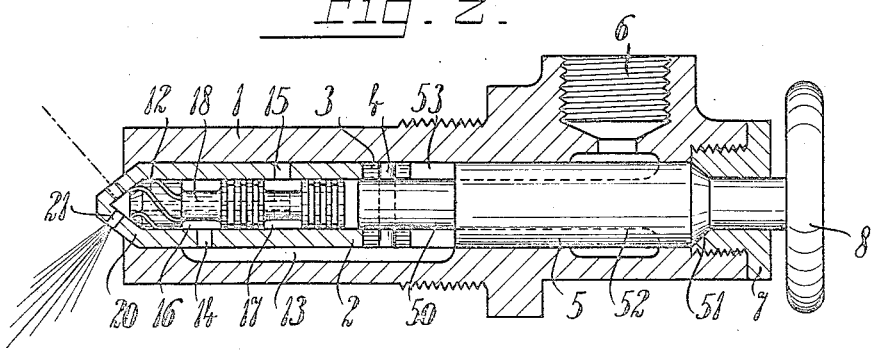
Inventor.
Fredrik Edholm,
By Henry Orth
Atty.

Patented Apr. 15, 1924.

1,490,164

UNITED STATES PATENT OFFICE.

FREDRIC EDHOLM, OF ESKILSTUNA, SWEDEN.

FUEL-INJECTING DEVICE FOR INTERNAL-COMBUSTION ENGINES.

Application filed June 27, 1921. Serial No. 480,861.

*To all whom it may concern:*

Be it known that I, FREDRIC EDHOLM, a citizen of the Kingdom of Sweden, residing at Eskilstuna, Sweden, have invented new and useful Improvements in Fuel-Injecting Devices for Internal-Combustion Engines, of which the following is a specification.

In internal combustion engines using liquid fuel in which the walls of the combustion chamber are, in part, cooled by water and, in part, not cooled it may happen that in case the fuel is injected towards the non-cooled part of the ignition chamber, the latter will be too hot when the engine is loaded, thereby causing an early ignition which will result in a decrease of the power of the engine. On the other hand, if the fuel is injected towards the cooled part, the engine when running light cannot maintain its temperature sufficiently high unless provision is made for a separate heating of the non-cooled part.

To overcome said difficulty it has been proposed to provide the fuel injecting device with eccentrically or obliquely arranged outlet openings and mount said device rotatably so that by rotation of said device the direction of the injected fuel may be varied.

When the fuel is sprayed it may happen in such engines that the amount of fuel, supplied to the engine when running light, is too small to reach the non-cooled portion of the ignition chamber. This would result in preventing the light running. On the other hand as spreading of the fuel is advantageous at full load, the injecting device is so arranged according to this invention, as to spread the fuel, when the injection takes place, in the direction towards the cooled portion of the ignition chamber. By injecting the fuel as non-divided jet, when the injection takes place in the direction towards the non-cooled portion, the jet is able to reach said non-cooled portion.

In the accompanying drawing, Figure 1 is a cross section of the ignition chamber of an internal combustion engine having a fuel injecting device embodying this invention;

Fig. 2 is a longitudinal section of the fuel injecting device;

With reference to Fig. 2, the numeral 1 designates the casing of the device. Said casing is shaped to form a sleeve having a cylindrical boring, in which is rotatably mounted a cylinder 2 and a bolt 5 situated in axial alinement with said cylinder. The cylinder 2 is closed at its outer end by a conical end portion 20 engaging a conical seat formed at the end of the boring of the casing 1. Engaging the cylinder 2, at the opposite end thereof, is a projection 50 extending from the bolt 5 and connected with the cylinder 2 by means of a crosspin 4, extending through an opening formed in the projection 50 and further extending through an axial slot 3 formed in the cylinder 2. The end of the bolt 5 away from the cylinder 2 is shaped to form a conical valve body 51, engaging a corresponding seat formed at the inner end of a nut 7 screwed in the casing 1 and through which the bolt 5 extends. Beyond the nut 7, the bolt 5 carries a hand-wheel 8. Formed on the periphery of the bolt 5 are axially extending grooves 52 communicating on the one hand with a fuel inlet 6 formed in the casing 1, and on the other hand with the space 53 surrounding the projection 50.

Formed in the conical end portion 20 of the cylinder 2 is an obliquely extending aperture 21 forming an outlet passage for the fuel.

Inserted in the cylinder 2 is a member 12 the left end of which fits in the boring of the casing 2 and is formed with spirally extending grooves. Formed in the member 12 between its ends are two circumferentially extending grooves 16 and 17. The groove 16 communicates in the position shown through hole 14, channel 13, space 53, and groove 52 with the fuel inlet 6 of the device. The fuel will in such position be rotated in passing through the said spiral grooves and be finely divided. Formed centrally in the member 12 is a hole 18 communicating at one end with the space left in front of the outlet opening 21, and at the other end with the groove 17. After a rotation of the bolt 5, through half a revolution away from the position shown, the hole 15 formed in the cylinder 2 leading to the groove 17 will communicate with the channel 13, while the hole 14 is closed. Fuel will now pass from 6 through channel 13, hole 15, and through the central hole 18 and will then be ejected through the aperture 21 in the conical fore end portion 20 as a non-divided jet, as indicated by the dotted lines, directed upwardly and forwardly.

In Fig. 1 there is shown a fuel injecting device according to this invention inserted into the wall of an ignition chamber. The full lines show the fuel as a spray directed towards the cooled portion 9 of the ignition chamber said direction of injection of the fuel being used in case of full load on the engine. With the engine running light, the hand wheel 8 is turned so that the fuel is injected as a solid jet towards the non-cooled portion 10 of the ignition chamber, as indicated by the dotted line.

What I claim is:

A fuel injecting device for internal combustion engines, comprising in combination an outer carrier body having a longitudinally extending cylindrical boring and a fuel inlet communicating with said boring, a conical seat formed at the inner end of the boring, an angularly adjustable sleeve fitting in said boring and having two separate fuel passages communicating with said fuel inlet at different angular positions of the sleeve, a conical bottom at one end of the sleeve engaging said conical seat and having a fuel outlet formed in it, a body fitting in said sleeve adjacent the said conical bottom said body having external spreading channels forming communication between said outlet and with one of said fuel passages and a central channel between the other of said fuel passages and said fuel outlet, and means for varying the angular position of said sleeve.

In testimony whereof I have signed my name.

FREDRIC EDHOLM.